United States Patent [19]
Oku

[11] Patent Number: 6,151,104
[45] Date of Patent: Nov. 21, 2000

[54] NEGATIVE MASK UNIT

[75] Inventor: Hiroshi Oku, Wakayama, Japan

[73] Assignee: Noritsu Koki Co., Ltd., Wakayama, Japan

[21] Appl. No.: 09/150,767

[22] Filed: Sep. 10, 1998

[30]    Foreign Application Priority Data

Sep. 11, 1997  [JP]  Japan ..................................... 9-246547
Sep. 12, 1997  [JP]  Japan ..................................... 9-248882

[51] Int. Cl.[7] ............................ G03B 27/00; G03B 27/62
[52] U.S. Cl. ............................................. 355/75; 355/18
[58] Field of Search ................................ 355/41, 72, 74, 355/75, 29, 50, 40, 76, 18, 91, 35, 39, 42, 43; 226/2, 27; 396/612, 622, 594, 598, 595, 599, 624, 646, 647, 615

[56]    References Cited

U.S. PATENT DOCUMENTS

| | | | |
|---|---|---|---|
| 4,252,436 | 2/1981 | Kogane ..................................... | 355/75 |
| 5,164,574 | 11/1992 | Ujiie et al. ............................... | 235/462 |
| 5,550,613 | 8/1996 | Hasegawa et al. ........................ | 355/41 |
| 5,614,986 | 3/1997 | Yoshikawa et al. ...................... | 355/18 |
| 5,767,943 | 6/1998 | Oberhardt et al. ........................ | 355/18 |
| 5,841,519 | 11/1998 | Ajimu et al. .............................. | 355/40 |

*Primary Examiner*—Russell Adams
*Assistant Examiner*—Rodney Fuller
*Attorney, Agent, or Firm*—Wenderoth, Lind & Ponack, L.L.P.

[57]    ABSTRACT

A negative mask unit which can perform exposure from either of reference film or new-type film simply by changing the direction of insertion of the negative film. The negative mask unit has a negative film feed passage provided between a base plate and a top plate. The film feed passage is composed of first to third feed passages. A negative mask is exchangeably set between the first and third feed passages. Two sets of mask-related members necessary to process reference film (135 film) and new-type film, including a film inlet, feed means, and sensors, are provided on one and the other sides of the negative mask, respectively. One of the sets is selected and film is inserted from the side of the selected set for exposure.

14 Claims, 17 Drawing Sheets

NEGATIVE MASK UNIT

BACKGROUND OF THE INVENTION

This invention relates to a negative mask unit which permits photoprinting both from new-type negative films that are handled housed in cartridges and from conventional negative films such as 135 films.

New-type films are now available which are fed from a cartridge for development and photoprinting, and fed back into the original cartridge for storage. Compared with conventional film, such new-type film is compact, easy to handle, and suited for automation of development and printing. Also, developed and printed film can be stored in the original cartridge.

While new-type negative film has such desirable properties, it is impossible to use a conventional photoprinter for exposure of such new-type film because it has a different width from any of conventional films such as 135 and 110 type negative films, and thus, its frames are not aligned with the exposure window of the negative mask provided at the exposure position in a conventional photoprinter.

New-type negative film has a magnetic information portion in the form of a transparent magnetic body for recording shooting conditions and other information. Thus, a photoprinter for processing such new-type negative film must have a reading means for reading such magnetic information.

For the above reasons, as photoprinters for processing new-type negative film, turntable-type printers have been proposed in which a cartridge is fed to a scanner unit or a printing/exposure unit and the negative film is unwound from the cartridge for printing/exposure, as disclosed in Japanese patent publication 7-36120. These devices can process only new-type negative film. In these devices, a negative mask unit including a negative mask at the exposure position can process only new-type negative film.

Since new-type film was introduced into the market only recently, such film is not used so much by ordinary people. Size 135 film is still the mainstream in the photographic industry. But with the increasing number of cameras for new-type film, it is expected that the workload of printing from new-type film will increase.

On the other hand, many people will keep using conventional size 135 film. Thus, photo studios will have to keep two photoprocessing machines, one for conventional film and the other for new-type film. Purchasing two such machines will be a heavy burden economically for photo shop owners.

Thus, in many photo shops, in order to process new-type film, they replace main components of a conventional photoprinter such as the negative mask and film guide with those for new-type film, instead of purchasing a new machine for new-type film. Of course, purchasing such replacement parts is a much more economical solution than purchasing a new processing machine. But these parts have to be exchanged every time the film type is changed, so that the work efficiency tends to markedly worsen.

In some photo shops, in order to minimize the frequency of replacements, only when a predetermined number of size new-type films have been collected will they be processed. This is possible because new-type film orders are still much fewer in number than size 135 orders. But since new-type film orders are expected to increase in the near future, an improved negative mask unit which is easy to exchange is desired.

An object of this invention is to provide a negative mask unit which can perform exposure processing from either of reference film and new-type film simply by exchanging a negative mask in the negative mask unit for reference film or new-type film and selecting the direction of insertion of negative film, and which is simple in structure, low in cost, and can process printing/exposure with extremely high efficiency.

SUMMARY OF THE INVENTION

According to this invention, there is provided a negative mask unit comprising a body having a film feed passage, a negative mask provided in the film feed passage so as to be replaceable, two sets of mask-related members, one for reference film and the other for new-type film, each set comprising a film inlet, feed means and sensors. The mask-related members for reference film being provided on one side of the negative mask and the mask-related members for new-type film being provided on the other side of the negative mask, whereby according to the type of negative film inserted into the negative mask unit, one of the two sets of mask-related members is selected and the negative film to be processed is inserted from the side of the selected set of mask-related members for exposure processing.

In this type of negative mask unit, the direction in which negative film is inserted is selected for printing/exposure. Negative film may be either reference film or new-type film. When either of them is selected, a negative mask is exchanged for one corresponding in size to the selected negative film by replacing or moving beforehand.

When reference film has been selected, film is inserted through an inlet on one side of the negative mask and fed to the negative mask by feed means. On the inlet side, various sensors as mask-related members are provided. Necessary information on the film is read by these sensors for printing/exposure.

When new-type film has been selected, the film is inserted through an inlet on the other side of the negative mask and fed to the negative mask by the feed means. Mask-related members are provided at the side of the inlet for the selected film to read necessary information on the film for printing/exposure.

Some photoprinters have a scanner unit as well as a printing/exposure unit. Others have a single processing unit that serves both as a scanner unit and a printer. The negative mask unit of the present invention can be used in the processing units of either type.

According to this invention, there is also provided a negative mask unit comprising a body having a film feed passage, a negative mask provided in the film feed passage so as to be exchangeable by replacement or by moving, and a mounting space provided on one side of the negative mask for mounting mask-related members including a film inlet, feed means and sensors that are needed for exposure by the negative mask, wherein one of mask-related members for reference film and those for new-type film is selected and detachably set in the mounting space, and wherein negative film corresponding to the selected mask-related members is inserted for exposure processing.

In the negative mask unit of the second embodiment, printing/exposure of reference film and new-type film is performed as follows. First, for printing/exposure of reference film, a negative mask for reference film is set, and mask-related members for reference film are also set in the mounting space.

Reference film for the thus selected mask-related members is inserted through the film inlet as one of the mask-related members, and fed by film feed means. In order to use this negative film unit in conjunction with the scanner unit, various information on the film being fed is read by various sensors as one of the mask-related members, and when each image frame comes to a position corresponding to the negative mask, feeding of the film is stopped and image information of the image frame is read by the scanner unit.

When the image information of all the image frames has been read, the average image density is calculated based on the image information obtained. The film is then fed in reverse and each image frame is stopped at the negative mask position for printing/exposure. When frame-by-frame printing/exposure is finished, the film is pulled out through the inlet. In this process, printing/exposure is carried out during reverse feed of the film, but film may be entirely fed back to the inlet side, and then fed in the normal direction for printing/exposure.

In the above description, we assumed that the negative mask unit is used in common with the scanner unit. But if it is separated from the scanner unit, film image and various other information is read in the scanner unit. In the printing/exposure unit, position information and image information gathered in the scanner unit are used for printing/exposure.

Next, for printing/exposure of new-type film, a negative mask and mask-related members for new-type film are selected and set as in the case of reference film. The new-type film is then set in the mask-related members and fed by the feed means for exposure/printing in the same manner as with reference film.

Thus, printing/exposure of both reference film and new-type film can be carried out efficiently by selecting a negative mask and mask-related members for the intended film, setting them in predetermined positions, and feeding the negative film through the film inlet as one of the mask-related members.

Other features and objects of the present invention will become apparent from the following description made with reference to the accompanying drawings, in which:

BRIEF DESCRIPTION OF THE INVENTION

DETAILED DESCRIPTION OF THE PREFERRED EMBODIMENT (First Embodiment)

Figure 1:
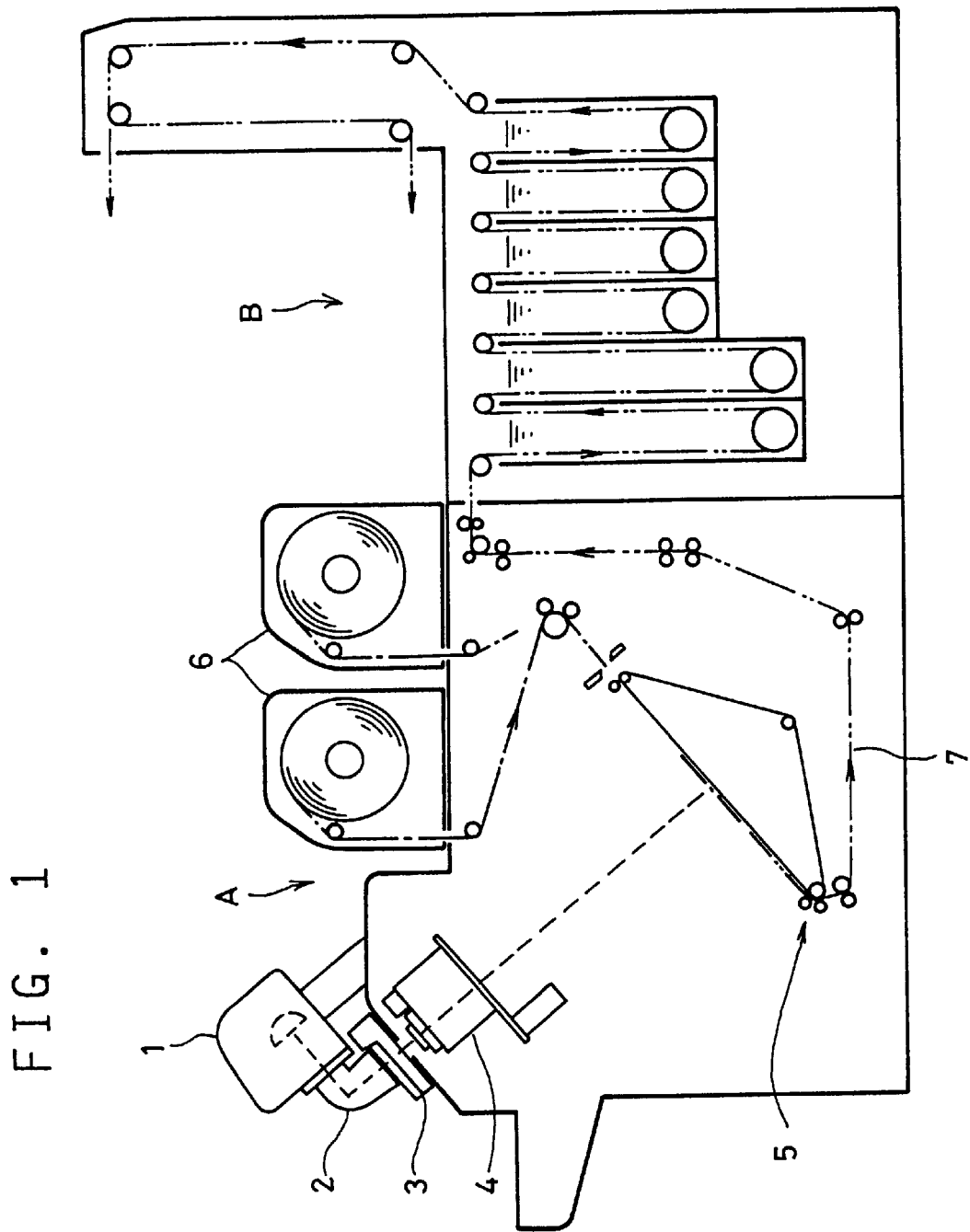
FIG. 1 is a schematic view of a photoprinter having a negative mask unit embodying the invention.

The photoprinter shown in FIG. 1 comprises a printing/exposure unit A and a developing unit B connected to the unit A. In the unit A, light from a light source 1 is guided through a mirror tunnel 2, a negative mask unit 3 and a lens unit 4 onto an exposure table 5. To the table, photosensitive material is fed from a paper magazine 6 by a conveyor 7. The feeding of photosensitive material is stopped frame by frame for printing/exposure. The thus printed photosensitive material is fed by the conveyor 7 into the developing unit B.

As shown, the negative mask unit 3 is provided outside the case of the printing/exposure unit A. During use, the mirror tunnel 2 is connected to the mask unit 3. As will be described in detail below, it is possible to process a negative film of a different size simply by disconnecting the mirror tunnel 2 and the light source 1 from each other by turning them, and replacing the negative mask in the negative mask unit 3.

Figure 2:
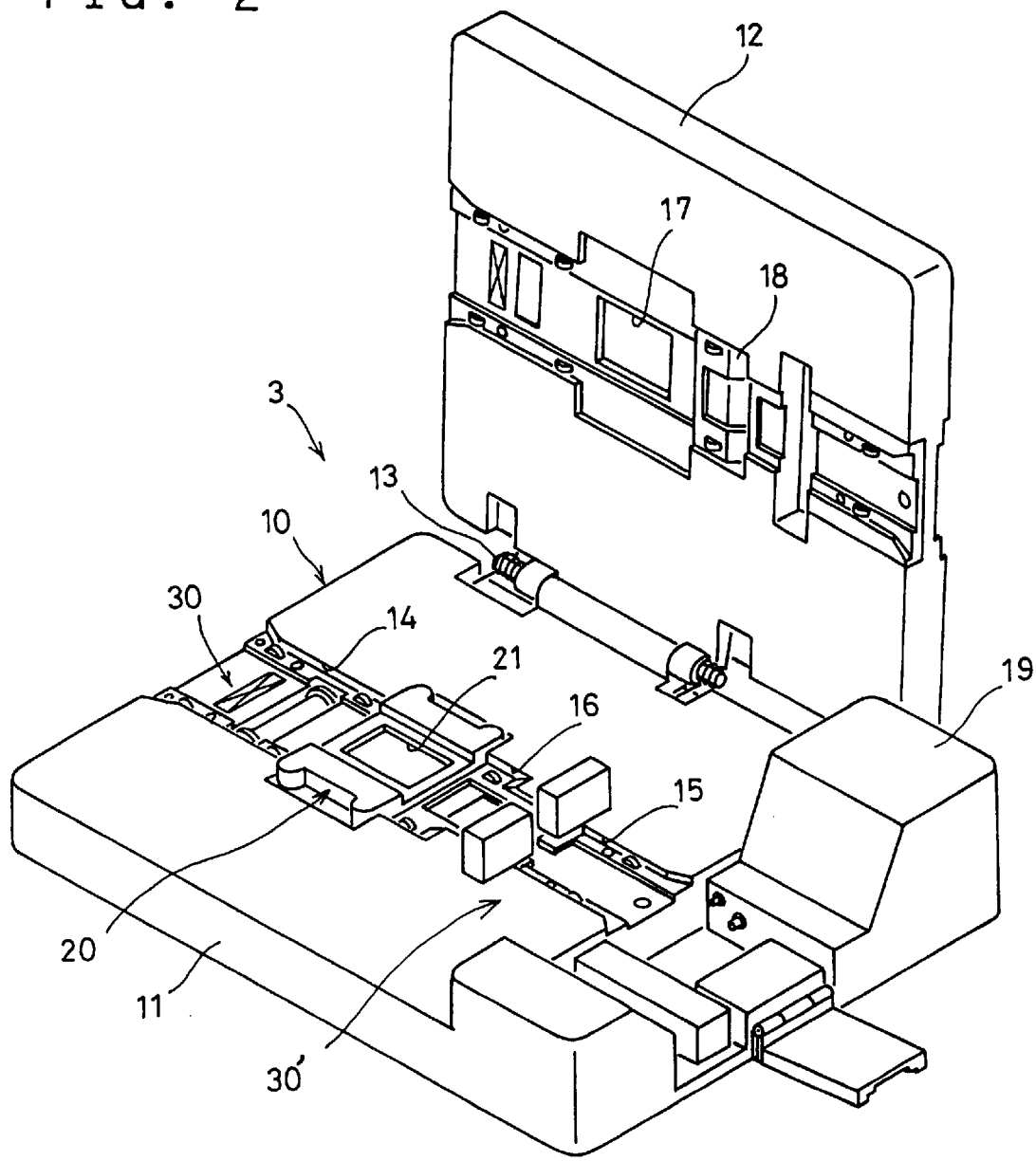
FIG. 2 is a perspective view of the negative mask unit (when opened)
Figure 3:
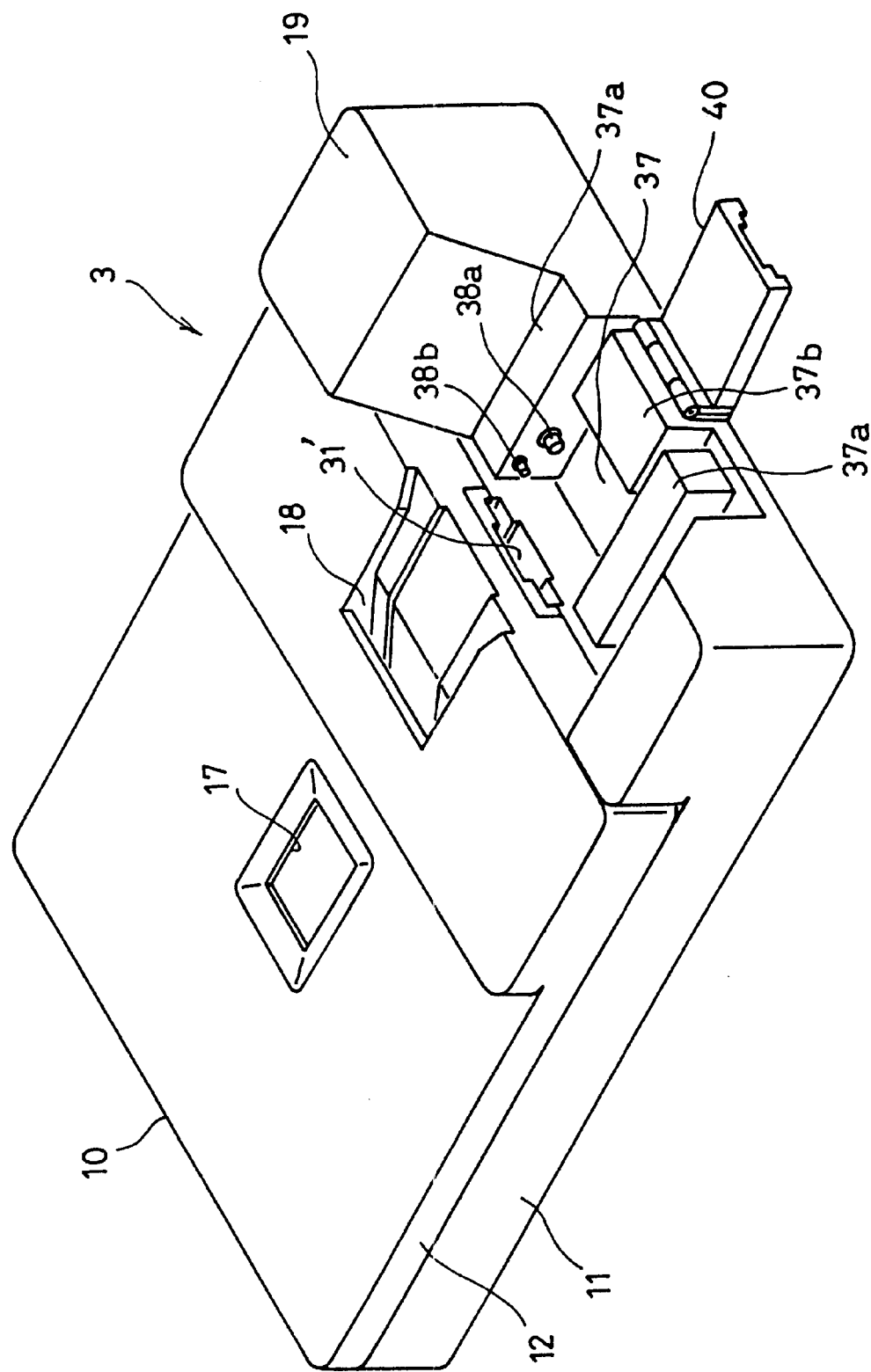
FIG. 3 is a perspective view of the negative mask unit (when closed)

FIG. 2 shows a perspective view showing a state in which a top plate 12 of a body 10 of the negative mask unit 3 is opened from a base plate 11, and FIG. 3 is a perspective view showing a state in which the top plate 12 is closed. As shown in FIG. 2, the top plate 12 can be opened to one side of the base plate 11 by a spring-loaded hinge 13. At the boundary between the top plate 12 and the base plate 11, a negative mask feed passage is provided so as to extend through the body 10.

The feed passage comprises a first feed passage 14 for a 135 film, which is a reference film, a second feed passage 15 for a new-type film (APS), which is narrower than the reference film, and a short third feed passage 16 provided between the first and second feed passages 14, 15. One of negative masks 20 of different sizes is exchangeably provided in the first feed passage 14. Provided along the first feed passage 14 at one side of the negative mask 20 are mask-related parts 30 comprising a reference film inlet 31, feed rollers 32 for feeding the reference film toward the negative mask 20, and sensors (FIG. 4).

Along the second feed passage 15, mask-related parts 30' comprising a new-type film inlet 31', feed means and sensors are provided at the other side of the negative mask 20. The third feed passage 16 has the same width as the first feed passage 14.

As shown in FIG. 3, the top plate 12 has a negative film exposure window 17 arranged so as to align with the negative mask 20 when the top plate is closed. As will be described below, a discharge passage 18 for discharging or inserting the reference film is provided at a position corresponding to the position where the third feed passage 16 is connected to the second feed passage 15. From this position, the discharge passage 18 extends obliquely upwardly through the top plate 12 in a direction different from the direction in which the second feed passage 15 extends. Numeral 19 indicates a motor unit for advancing film.

Figure 4:
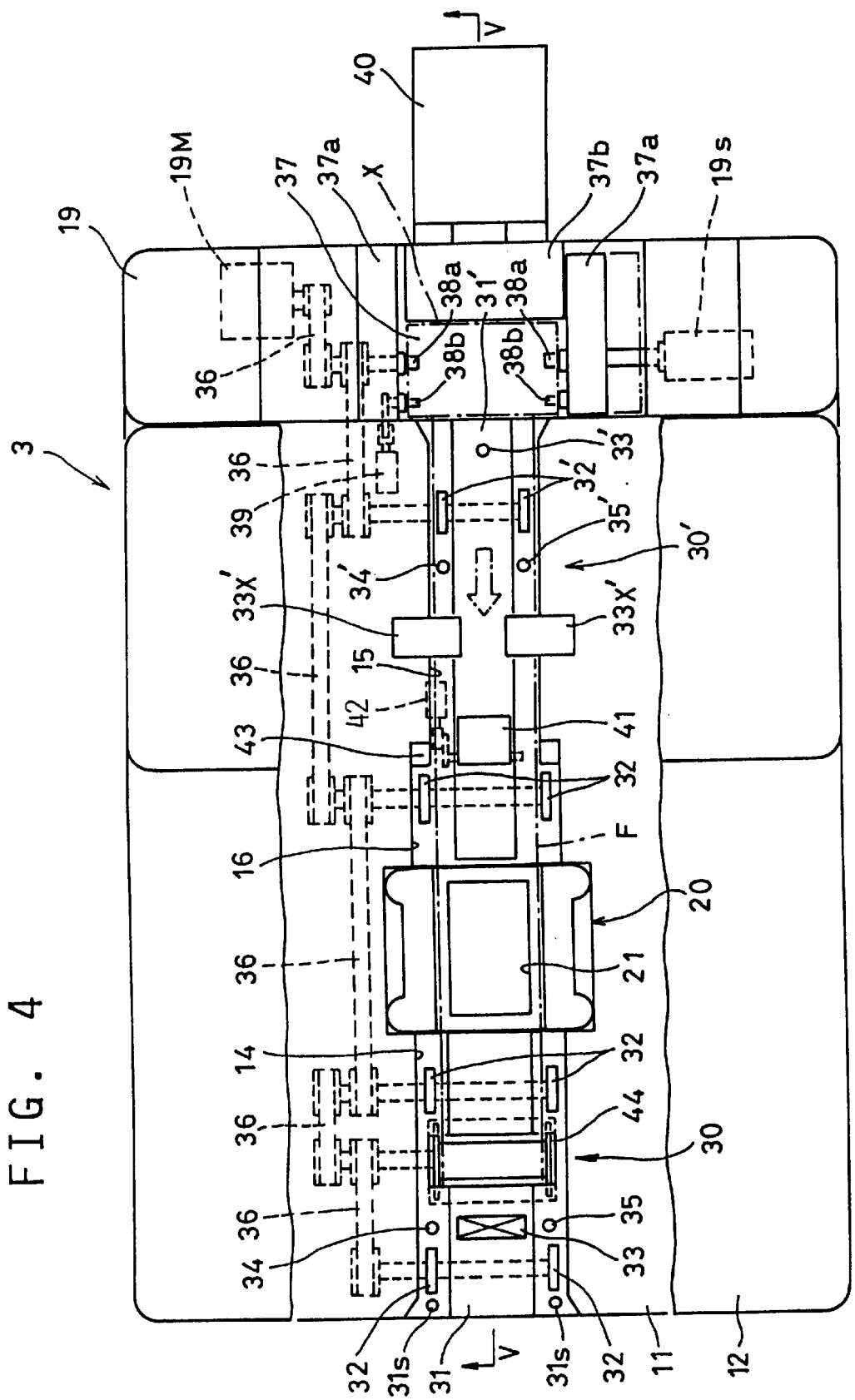
FIG. 4 is a partially broken away plan view of the negative mask unit.

The mask-related parts 30 comprise the reference film inlet 31 provided at one side of the first feed passage 14, the feed rollers 32 arranged at suitable intervals along the first feed passage 14 for feeding the reference film inserted through the inlet 31, and the sensors including a frame detection sensor 33, a perforation sensor 34, and a DX sensor 35 (FIG. 4).

The feed rollers 32 are provided such that rotation is transmitted thereto synchronously from a motor 19M of the motor unit 19 through a plurality of pulleys provided at one end of the roller shafts and belts 36 trained around the pulleys.

While not shown in detail, film guides are provided along the first and third feed passages 14, 16 between the top plate 12 and the base plate 11.

The mask-related parts 30' comprise the new-type film inlet 31' provided at the other end of the second feed passage 15, the feed rollers 32' arranged at suitable intervals along the second feed passage 15 for feeding film inserted through the inlet 31', and the sensors including a film tip detection sensor 33', a perforation sensor 34', a bar code sensor 35' and magnetic heads 33X'.

Like the other feed rollers 32, the feed rollers 32' are connected with and synchronously driven by the motor 19M through pulleys and belts. Film guides are provided along the second feed passage 15 between the top plate 12 and the base plate 11 as well. In front of the inlet 31', a cartridge insertion space 37 for a new-type film cartridge X is provided. Cartridge holders 37a are provided on both sides of the space 37. A cartridge support plate 37b is also provided.

One of the cartridge holders 37a is movable from the position shown by the two-dot chain lines to the position indicated by the solid lines. The cartridge holder 37a is moved to the solid line position by a solenoid 19s to hold a cartridge X. Numeral 38a indicates protruding shafts for rotating the spool shaft of a cartridge. Protruding shafts 38b are used to open and close the cartridge door. The protruding shafts 38a are coupled to the motor 19M through a spool and a pulley. The protruding shafts 38b are coupled to a solenoid 39.

Outside the cartridge support plate 37b, a strip film insertion guide 40 is foldably provided through a hinge for the case where new-type film is a strip of film. This is because the new-type film sometimes is completely taken out of a cartridge for the convenience of printing/exposure, though in most cases it is handled in the cartridge.

Near the boundary between the second feed passage 15 and the third feed passage 16, a changeover means 41 is provided for changing the feed direction of negative film when the reference film is discharged. This changeover means 41 comprises a changeover plate having rotary shafts at both ends, and a solenoid 42 for rotating one of the rotary shafts. An inclined guide 43 is fixed to one end of the third feed passage 16.

Figure 5:
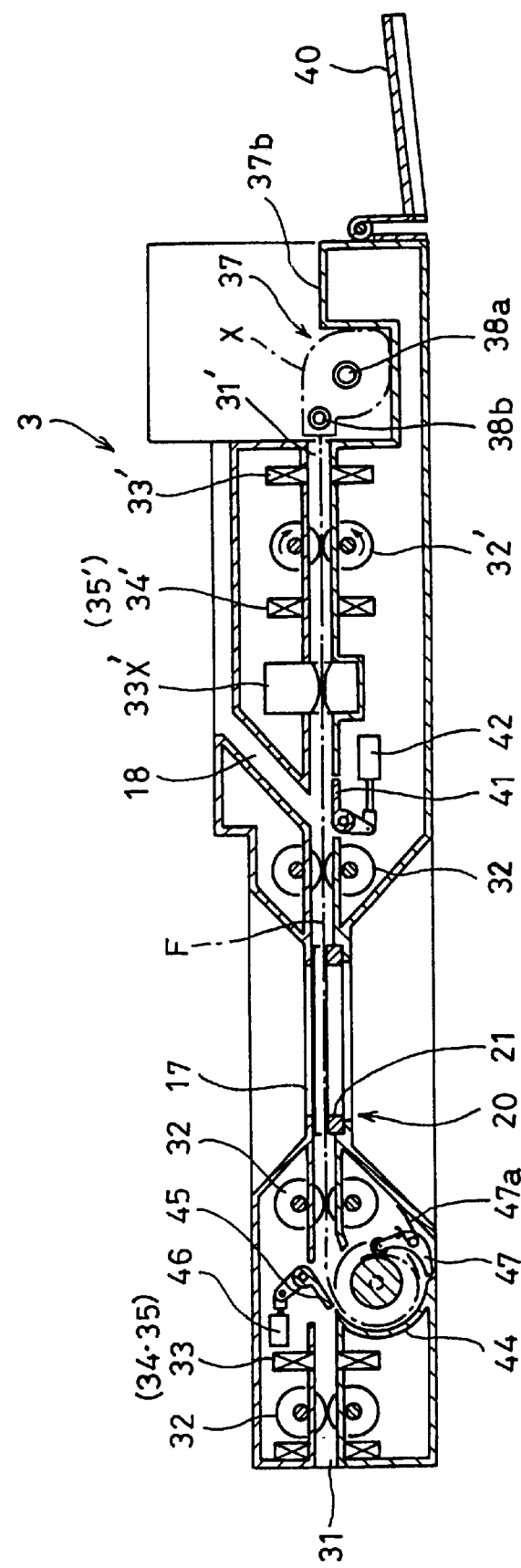
FIG. 5 is a sectional view as viewed from arrow V—V of FIG. 4.

As shown in FIGS. 4 and 5, a winder 44 for new-type negative film is provided at an intermediate portion of the first feed passage 14. This winder 44 has a spool having a rotary shaft synchronously driven by the motor 19M through pulleys. Provided around the winder 44 is a film guide 45 driven by a solenoid 46 to guide a film tip being inserted. Film is pressed against the spool by a film presser 47 biased by a spring 47a.

Now description is made of the operation of the negative mask unit 3 of this embodiment. The negative mask unit 3 shown can process both 135 film (reference film) and new-type film. It can process the following three formats:

1) processing of reference film;
2) processing of new-type film in a cartridge;
3) processing of new-type film in a strip.

The above processings are hereinafter abbreviated to processes 1–3.

Figure 6:
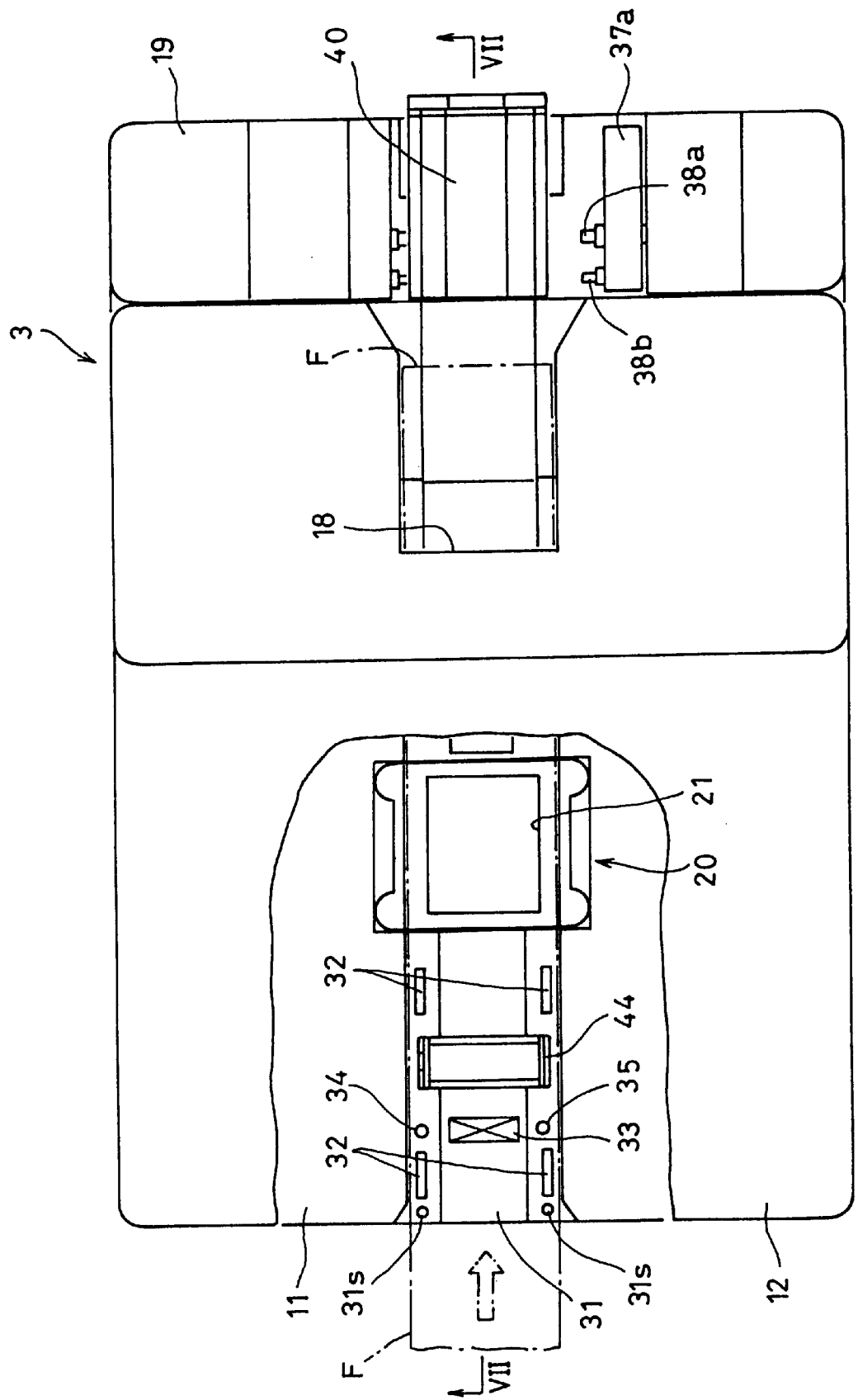
FIG. 6 is a plan view showing how size 135 film is processed.
Figure 7:
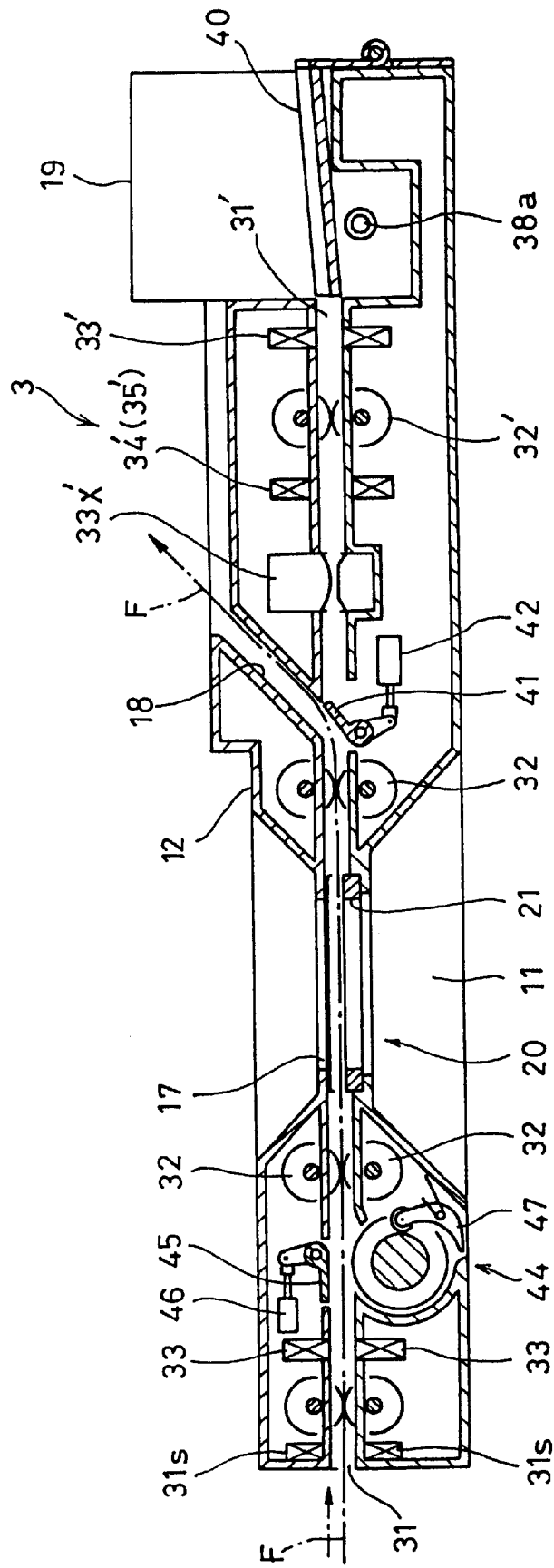
FIG. 7 is a sectional view showing how size 135 film is processed.
Figure 8:
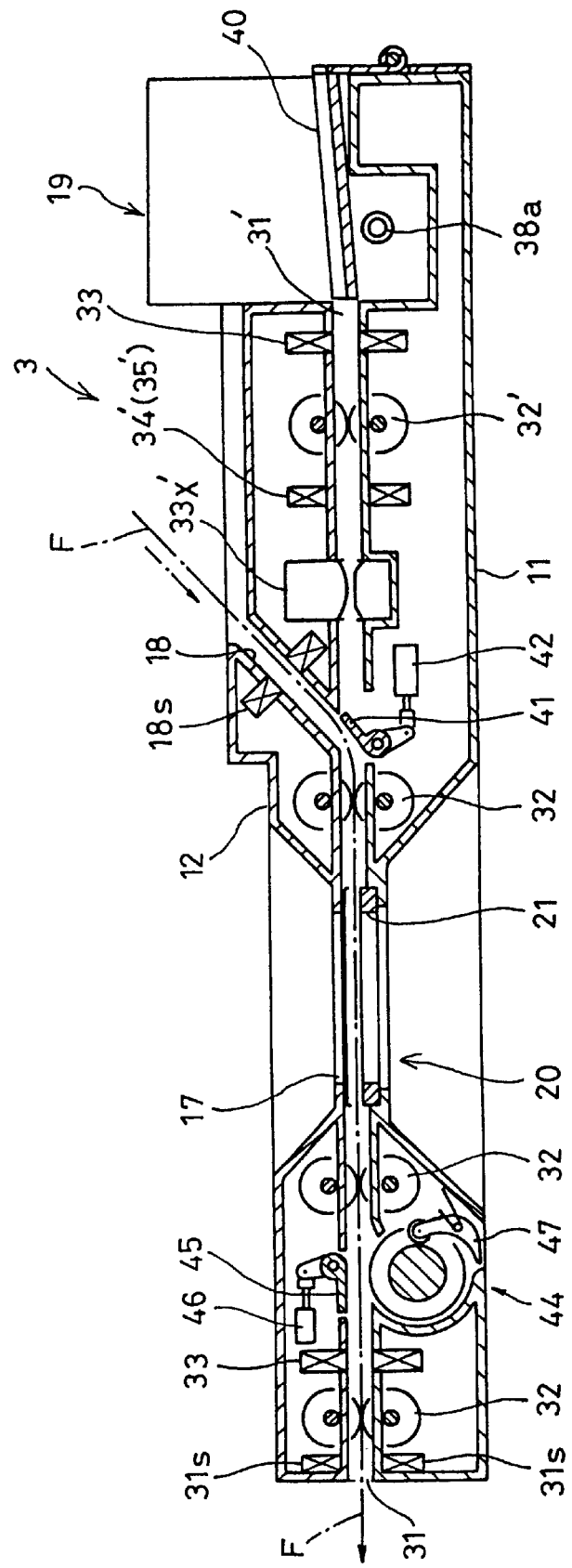
FIG. 8 is a view showing how size 135 film is processed during reverse feed.

In Process 1, a negative mask 20 having a width suitable for 135 film, shown in FIGS. 6, 7, is used to process 135 film which is a reference film. While not shown, as a scanner unit, the light source 1, mirror tunnel 2, negative mask unit 3 as shown in FIG. 1 are commonly used. It is possible to guide image light to a scanner unit and read image information by rotating or moving the lens unit 4 out of the optical path and inserting a reflecting mirror thereinto.

If such a scanner unit is used, when 135 film F is inserted through the inlet 31 near the first feed passage 14, a film insertion sensor 31s detects the tip of the film, activating the rotation of the feed rollers 32 (by motor 19M) to feed film F forward along the first feed passage 14. The perforation sensor 34 detects the amount of feed. The frame detection sensor 33 detects each frame image area. The DX sensor 35 detects film type and other information.

After detection of various kinds of information, 135 film is stopped temporarily every time each of its frames aligns with a mask opening 21 of the negative mask 20, and the image information is read by the scanner means. When the image information of each frame has been read, film F is fed frame by frame. When its tip reaches the discharge passage 18 the, film is guided into the discharge passage 18 by the changeover means 41. As shown in FIG. 7, the changeover means has been changed over to its upward position by now, so that the 135 negative film F is fed upward.

When information has been read from all the image frames of the negative film F, the film is fed further and stopped at a position where its tail end is still caught between the feed rollers 32 in the third feed passage 16. When the image information has been analyzed, the negative film F is fed in a reverse direction. During the reverse feed, the amount of film fed is calculated and the film is stopped temporarily at a position where each of its frames aligns with the negative mask 20 for printing/exposure in which the amount of light from the light source 1 is adjusted based on the image information read.

When printing/exposure for all the image frames is finished, the negative film F is further fed in reverse to take it out. Instead of carrying out printing/exposure during reverse feed, the film may be rewound entirely and then fed forward for printing/exposure.

In the above description, it is assumed that the printing/exposure unit is also used as the scanner unit. However, a separate scanner unit comprising a light source 1, a mirror tunnel 2, and a negative mask unit 3 may be provided separately to read image information before printing/exposure.

In this case, since image information has been read beforehand, negative film F has only to be fed forward, and only the position information from the perforation sensor 34 is needed. The frame detection sensor 33 and the DX sensor 35 are not needed. But these sensors are all needed in the separate scanner unit.

Since narrow new-type film is insertable through the inlet 31 for 135 film, new-type film may be inserted through the inlet 31 by mistake. Thus in this arrangement, there are two insertion sensors 31s provided, so that film is fed only if the insertion of the film has been detected by both sensors 31s (this means that film is 135 film).

In the above description, it is assumed that 135 film is inserted through the inlet 31. But instead, as shown in FIG.

8, 135 film may be inserted through the discharge passage 18. In this case, the entire film is fed to the other end first, and then fed in the forward direction in the same manner as in Process 1. A film detection sensor 18s is provided in the discharge passage 18 to start such reverse insertion process when the insertion of film is detected by this sensor.

On the other hand, it is also possible to process new-type film without detaching it from a cartridge in Process 2. In this case, the negative mask 20 is replaced with a mask of a size for new-type film; a cartridge X is inserted into the space 37; and one of the cartridge holders 37a is moved by the solenoid 19s to grip the cartridge X between the cartridge holders 37a. Then, one of the protruding shafts 38b is rotated by the solenoid 39 to open the door of the cartridge X, and one of the shafts 38a is rotated by the motor 19M to unwind the negative film.

The unwound negative film F is fed by the feed rollers 32', the amount of film fed is detected by the perforation sensor 34', bar-coded information such as the kind of film, which is recorded on one side of the film, is detected by a bar code sensor 35', and various shooting conditions and other information recorded on new-type film are detected by a magnetic head 33X'.

If the printing/exposure unit is used also as the scanner unit, each time each image frame is stopped at the position aligned with the negative mask 20 and the image information has been read by the scanner means, the film is fed a little. The film is thus fed past the negative mask 20 until all the frames are wound onto a winder 44 in the first feed passage 14. While the film is being wound, data necessary to determine printing/exposure conditions such as the average image density of all the image frames are calculated.

Next, the negative film F wound onto the winder 44 is unwound to print/expose the image on each frame to a photosensitive material. When all the frames have been printed and exposed, the entire negative film F is wound into the cartridge X. But instead, the entire film may be wound into the cartridge X and then unwound for printing/exposure with its front end first.

When the negative film is unwound from the cartridge X in the above process, its tail end is kept fastened to the cartridge X, and its portion from the tail end to the negative mask 20, i.e. the portion in the second and third feed passages 15, 16 is left as a dead space film. Thus, the film can be freely wound and unwound between the cartridge X and the winder 44.

Reference film or 135 film is too wide to be insertable into the inlet 31' for new-type film. Thus in this case, no sensor for detecting erroneous insertion of film is necessary. If necessary, sensors similar to the insertion sensors 31s may be provided.

Processes 1 and 2 are basic operations in which reference film is inserted from one side and new-type film is inserted from the other side for printing/exposure. But besides processes 1 and 2, the negative mask unit 3 of this embodiment can also perform process 3.

Figure 9:
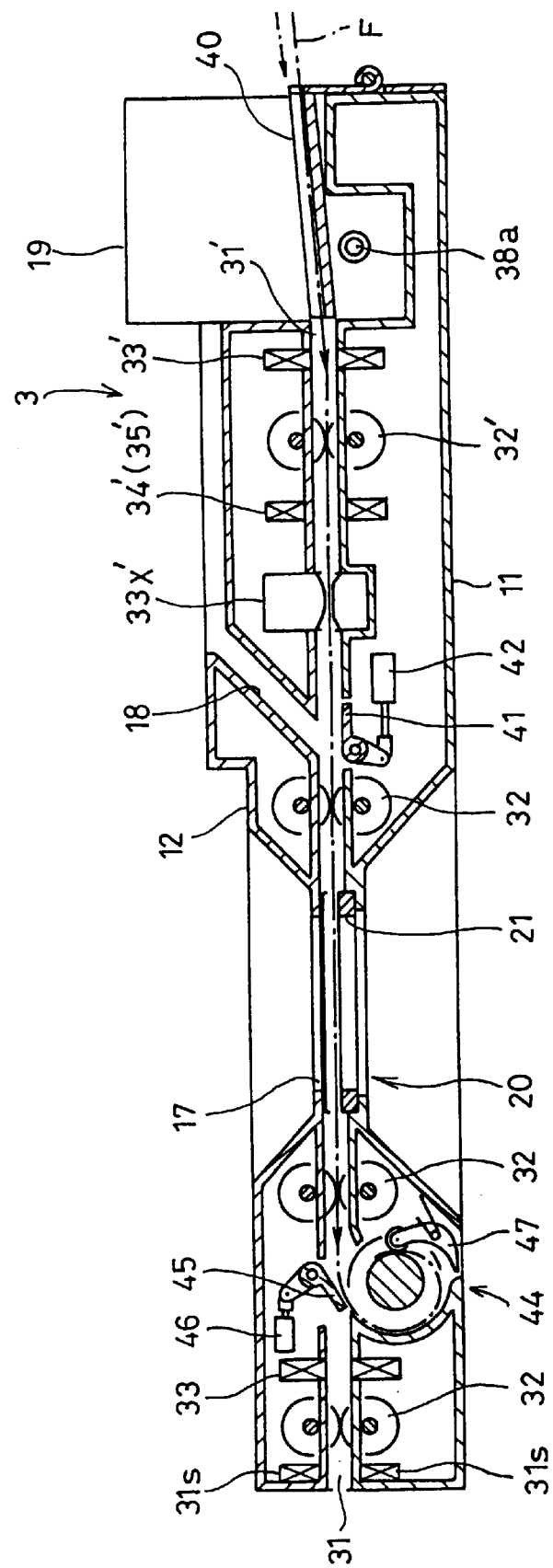
FIG. 9 shows how a strip of new-type film is processed.

In Process 3, as shown in FIG. 9, it is possible to process new-type film that has been entirely taken out of a cartridge X into the form of a strip of film. To process such a strip of new-type film, the film guide 40 is inclined toward the insertion space 37 as shown in FIG. 9, and the film is placed on the guide 40 and manually inserted through the inlet 31'. The steps thereafter are the same as with film attached to a cartridge.

The necessity for the processing of a strip of new-type film is present because one sometimes wishes to print strip film rather than rewinding film into a cartridge after development for the convenience of personnel arrangement.

As has been described in detail, the negative mask unit of this invention has an exchangeable negative mask unit provided in a film feed passage. Film-related members including film inlets, feed means and sensors are provided on both sides of the negative mask. Scanning or printing of film is thus possible simply by replacing a negative mask with another one corresponding in size to negative film to be processed, and inserting film from the direction suitable for the negative film. Since the operation is extremely easy, film can be processed with high efficiency. Since the structure is simple, the cost is low.

(Second Embodiment)

Figure 10:
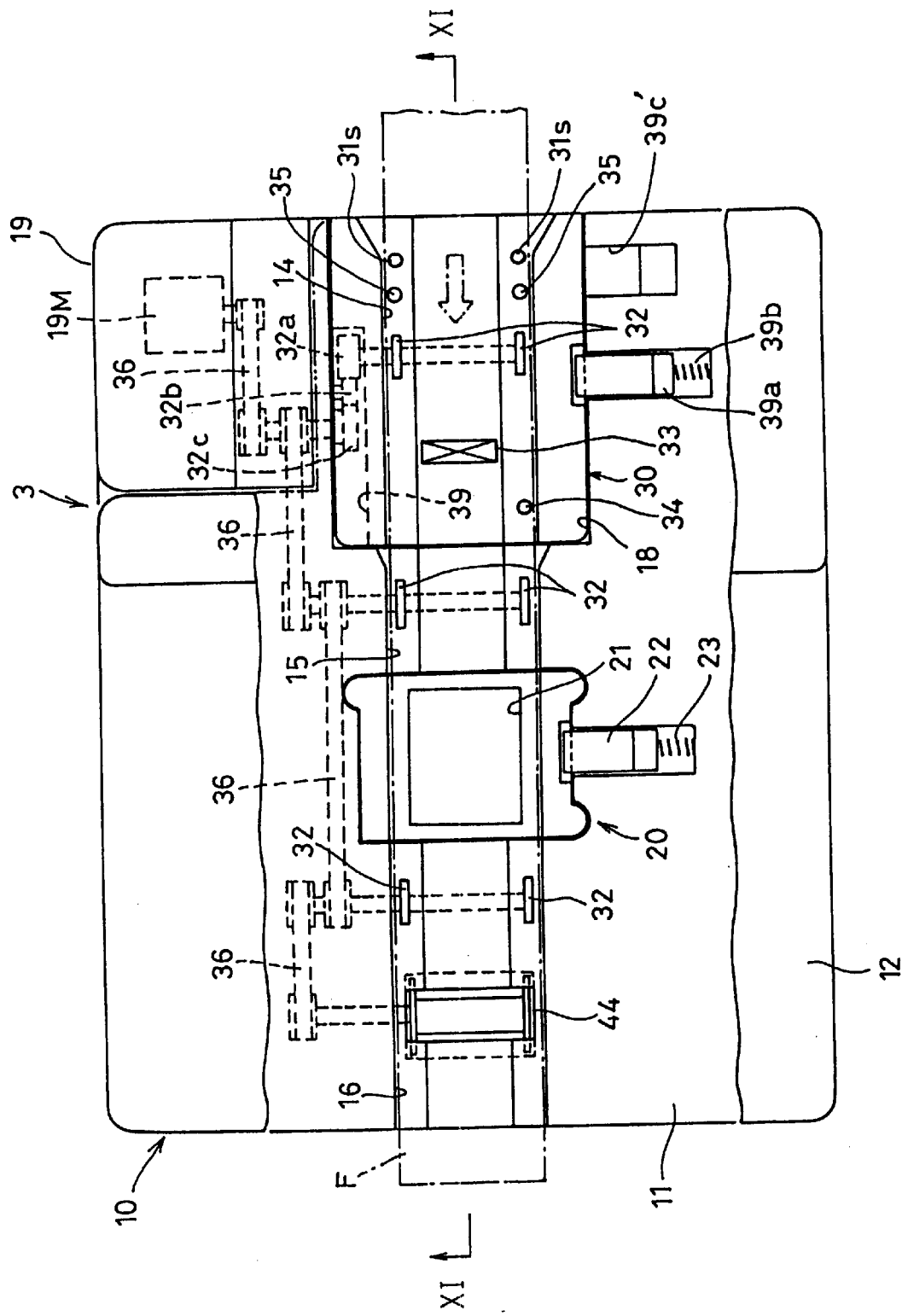
FIG. 10 is a partially broken away plan view of the negative mask unit of the second embodiment (carrying a mask for reference film)
Figure 11:
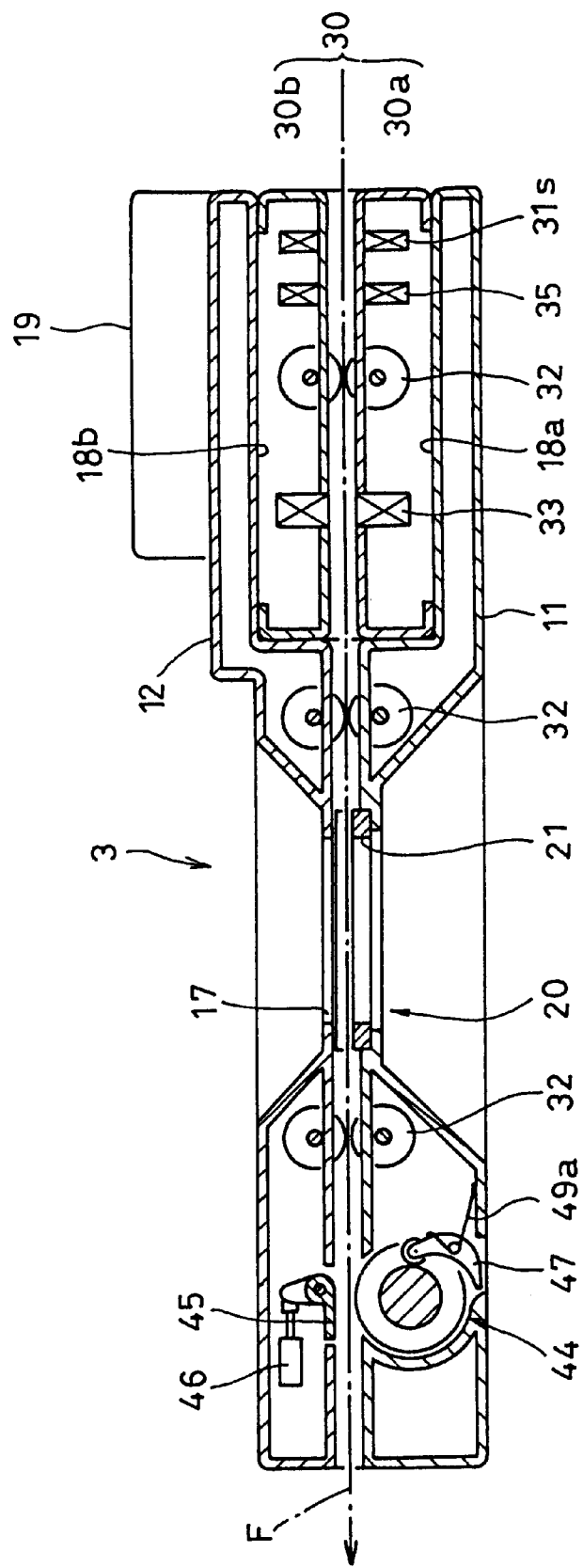
FIG. 11 is a sectional view as viewed from the arrow XI—XI of FIG. 10.
Figure 12:
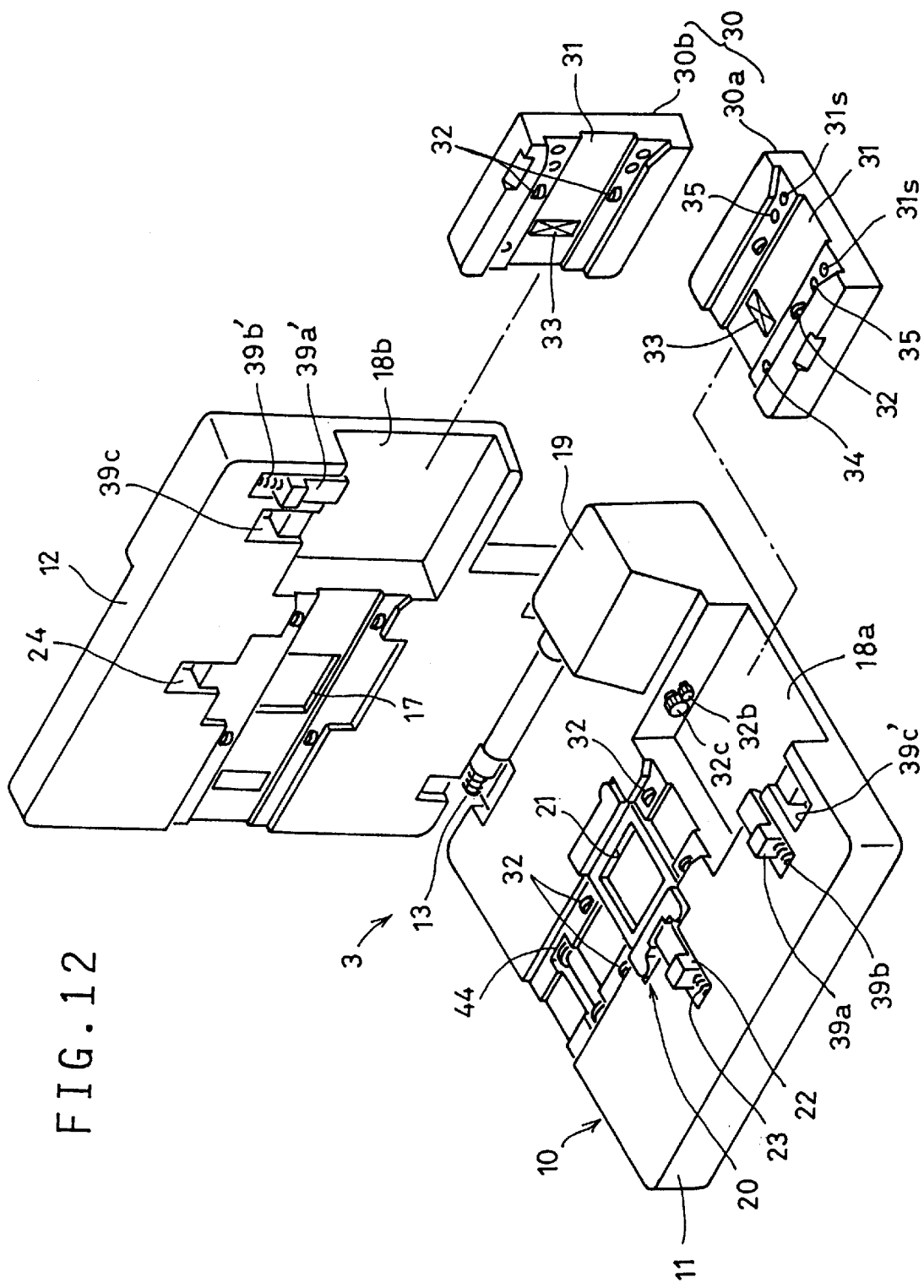
FIG. 12 is a perspective view of the negative mask unit of the second embodiment (when opened)

FIG. 10 shows a plan view in which a top plate of a body 10 of the negative mask unit 3 is partially broken away. FIG. 11 shows a section as viewed from the arrow III—III of FIG. 10. FIG. 12 is a perspective view showing the state in which a base plate 11 is open. As shown in FIG. 12, the top plate is openable to one side from the base plate 11 by a spring-loaded hinge 13. At the boundary between the top plate 12 and the base plate 11, a negative film feed passage is provided across the body 10.

The feed passage comprises a first feed passage 14 for 135 film, a reference film, which is provided on one side of the negative mask 20, a short second feed passage 15 provided on the same one side of the negative mask 20, and a third feed passage 16 provided on the other side of the negative mask 20. One of negative masks 20 of different sizes is exchangeably provided between the second and third feed passages 15 and 16. A space 18 for receiving mask-related members 30, 30' is provided on the one side of the negative mask 20.

The negative mask 20 shown in FIGS. 10 and 12 is for reference film. A mask-locking bar 22 and a spring 23 are embedded along the outer periphery of the negative mask 20 to hold the mask 20 in the illustrated position. A cutout 24 for receiving the locking bar 22 is formed in the top plate 12.

The first, second and third feed passages 14, 15 and 16 are of the same width. The first feed passage 14 is formed in the mask-related members 30, 30' which will be described below. As shown in FIGS. 11 and 12, the top plate 12 has a negative film exposure window 17 arranged so as to align with the negative mask 20 when the top plate is closed. Numeral 19 indicates a conveyor motor unit.

As shown in FIG. 12, the mask-related member 30 for reference film includes a reference film inlet 31 at an end remote from the third feed passage 16 when the member 30 is set in the negative mask unit body 10, feed rollers 32 provided as means for feeding reference film inserted through the inlet 31, and a group of sensors including a frame detection sensor 33, a perforation sensor 34, DX sensors 35.

As shown in FIG. 12, the mask-related member 30 is divided into lower and upper block 30a, 30b. The first feed passage 14 is formed at the boundary between the two blocks. Also for the space 18, a lower space 18a and an upper space 18b are formed in the base plate 11 and the top plate 12, respectively.

A locking bar 39a is embedded at the edge of the lower space 18a in the base plate 11 together with a spring 39b to fix the lower block 30a to the space when set in the space. A cutout 39c is formed at the edge of the upper space 18b in the top plate 12 to receive a protrusion of the locking bar 39a.

Similarly, a locking bar 39a' is embedded at the edge of the upper space 18b of the top plate 12 together with a spring 39b' to fix the upper block 30b to the upper space. A cutout 39c' is formed at the edge of the lower space 18a in the base plate 11.

In this embodiment, the blocks 30a and 30b are set in the spaces 18a and 18b of the base plate 11 and the top plate 12, respectively. The blocks 30a and 30b may be coupled together by a hinge in the same manner as the base plate 11 and the top plate 12 which are coupled together by the hinge 13. In this case, the locking bar 39a' and the spring 39b' of the top plate 12 and the cutout 39c' of the base plate 11 are not needed.

The feed rollers 32 have gears 32a at one end of their roller shafts. The gears 32a are fixed to the negative mask unit body 10 so as to engage a pinion 32b and a gear 32c when the mask-related member 30 is mounted on the negative mask unit 10. A belt 36 is trained around this gear shaft to synchronously transmit its rotation from the motor 19M of the conveyor motor unit 19 to the feed rollers 32. Numeral 69 indicates a cutout that prevents the mask-related member 30 from interfering with the pinion 32b and the gear 32c. While not shown, a film guide is provided along the first, second and third feed passages 14, 15 and 16 between the top plate 12 and the base plate 11.

Feed rollers 32 are provided along the second and third feed passages 15 and 16. Like the feed rollers 32 provided along the first feed passage 14, these feed rollers 32 have pulleys at one end of their roller shafts around which are trained belts 36. The feed rollers 32 are thus driven synchronously by the motor 19M through a plurality of pulleys and the belts 36.

Figure 13:
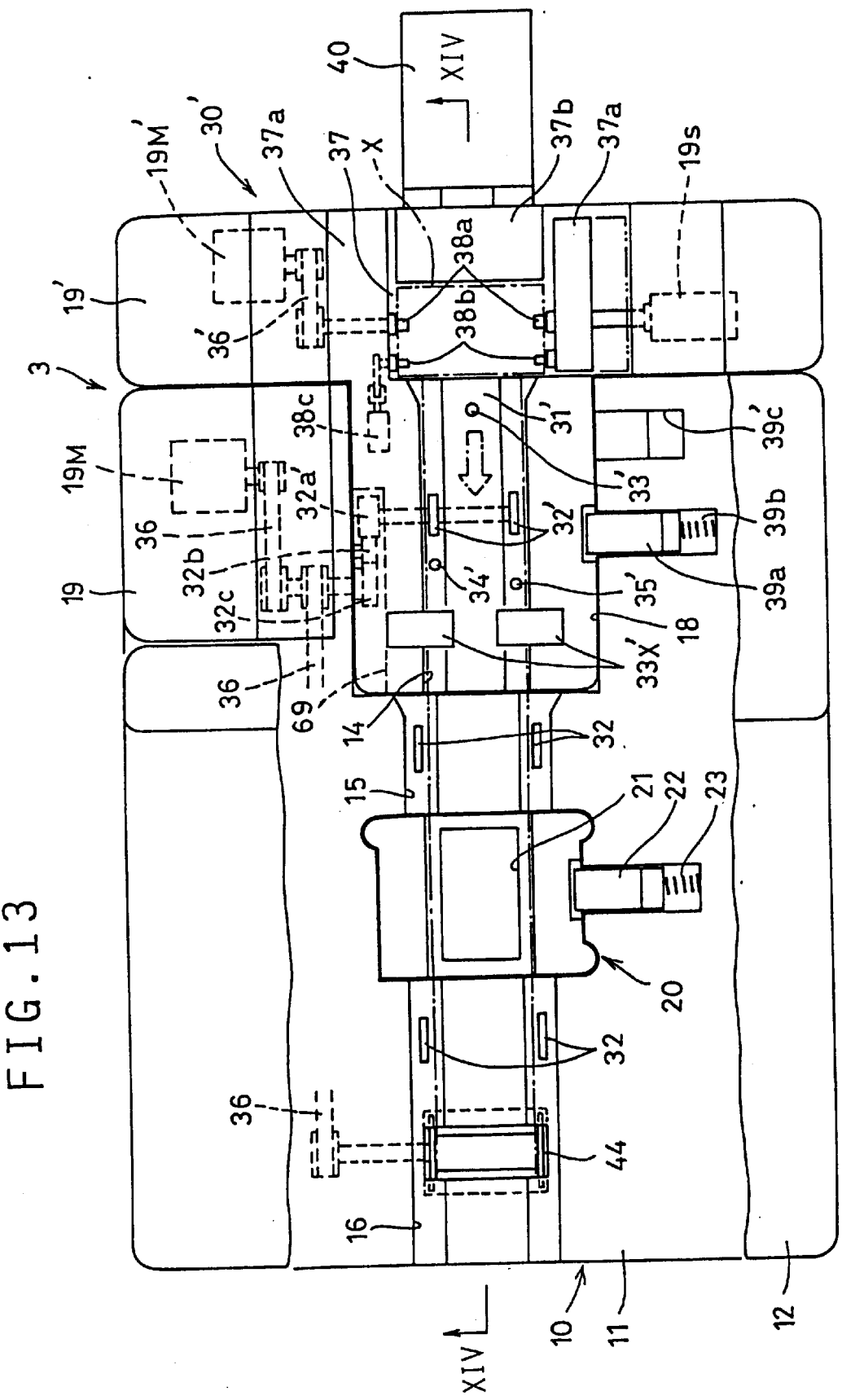
FIG. 13 is a partially broken away plan view of the negative mask unit of the second embodiment (carrying a mask for new-type film)
Figure 14:
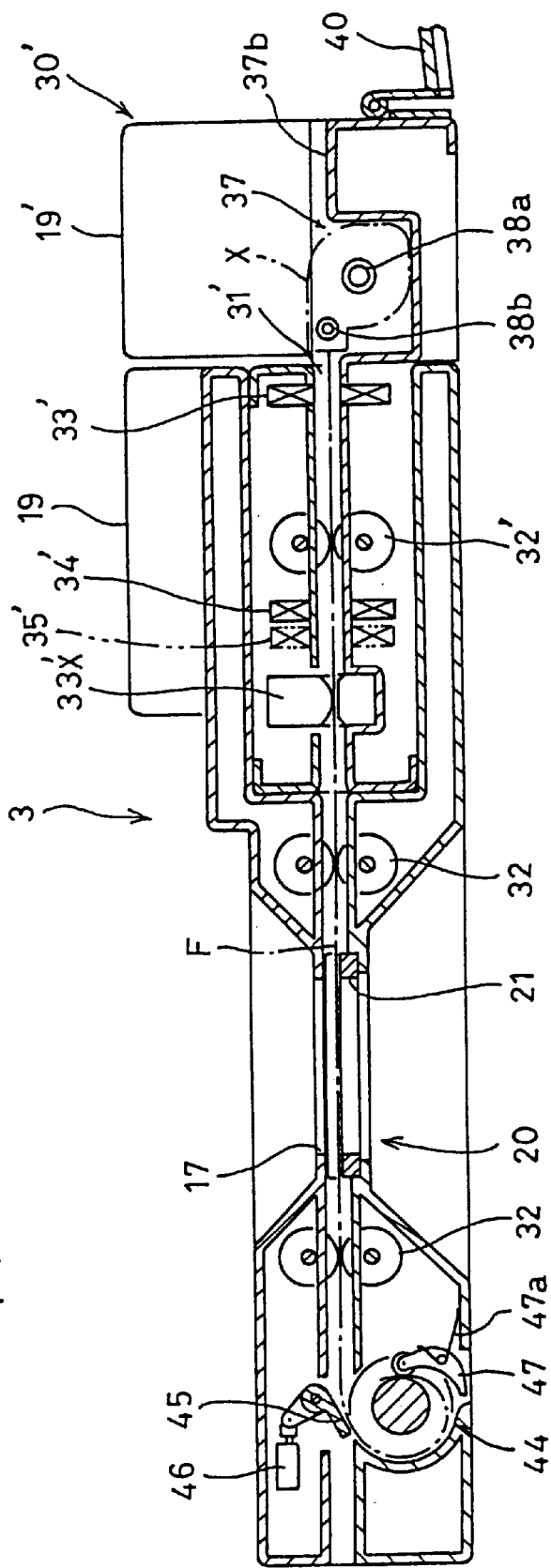
FIG. 14 is a sectional view as viewed from the arrow XIV—XIV of FIG. 13.
Figure 15:
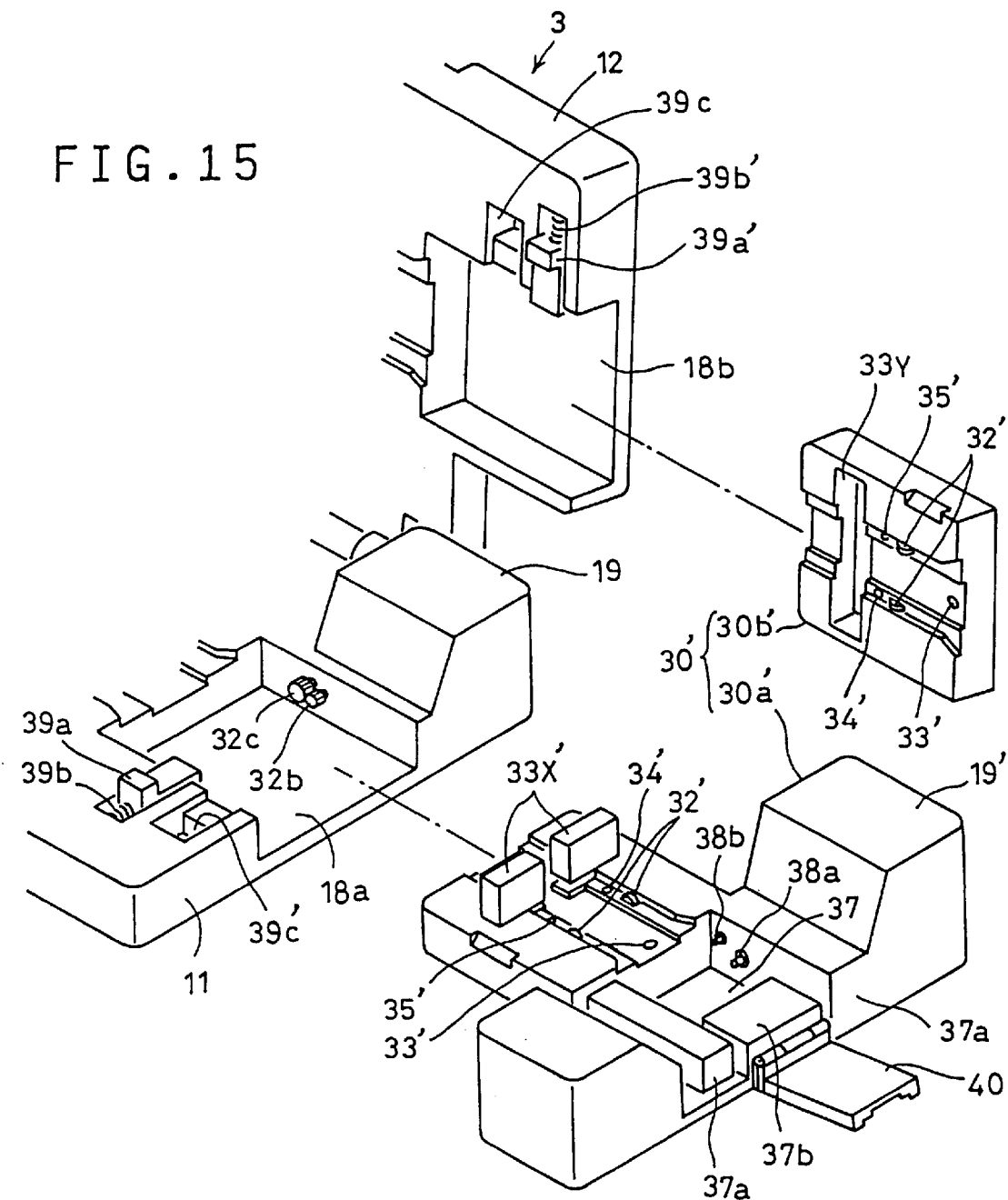
FIG. 15 is another perspective view of the negative mask unit of the second embodiment (when opened)

FIGS. 13–15 are plan, sectional and perspective views of the negative mask unit 3 carrying the mask-related member 30' for new-type film. FIGS. 13–15 correspond to FIGS. 10–12, respectively.

As shown in FIG. 13, the mask-related member 30' for new-type film comprises a block having the shape of the letter T as viewed from above and necessary elements mounted thereon. The straight portion of the T-shaped block is split into an upper block 30b' and a lower block 30a'. The upper block 30b' is identical in shape to the upper block 30b of the mask-related member 30 for reference film. The lower block 30a' is T-shaped.

Thus, as shown in FIG. 15, the upper block 30b' is received in the space 18b formed in the top plate 12 of the negative mask unit body 10, while the straight portion of the lower block 30a' is received in the space 18a of the base plate 11. When the top plate 12 is superposed on the base plate 11, the upper and lower blocks are brought into close contact with each other as shown in FIG. 14.

The mask-related member 30' includes a reference film inlet 31' for new-type film provided at an end of its straight portion remote from negative mask 20, fixed feed rollers 32' provided in the first feed passage 14 as means for feeding film inserted through the inlet 31', and a group of sensors provided along the first feed passage 14 and including a film tip detection sensor 33', a perforation sensor 34', a bar code sensor 35' and a magnetic head 33X'.

Like the mask-related member 30, when the mask-related member 30' is set in the space 18, the feed rollers 32' engage the pinion 32b and the gear 32c through gears 32a' at one end of their shafts, and thus connected to and synchronously driven by the motor 19M through pulleys and the belt 36. A film guide is provided between the upper and lower blocks 30b' and 30a' along the first feed passage 14 of the mask-related member 30'. In front of the inlet 31' formed in the T-shaped lower block 30b', a space 37 for receiving a cartridge X for new-type film is provided. Cartridge holders 37a are provided on both sides of the space 37. Numeral 37b indicates a cartridge support plate.

As shown in FIG. 13, one of the cartridge holders 37a is movable from the position shown by two-dot chain lines to the position indicated by solid lines. The cartridge holder 37a is moved to the solid line position by a solenoid 19s to hold a cartridge X. Numeral 38a indicates protruding shafts for rotating the spool shaft of a cartridge. Protruding shafts 38b are used to open and close the cartridge door. The protruding shafts 38a are coupled to a motor 19M' through a spool and pulleys 36' provided on the lower block 30a' separately from those fixed to the base plate 11. The protruding shafts 38b are coupled to a solenoid 38c.

Outside the cartridge support plate 37b, a strip film insertion guide 40 is foldably provided through a hinge in the case where new-type film is a strip of film. This is because new-type film may sometimes be entirely taken out of a cartridge for the convenience of printing/exposure, though in most cases, it is handled kept in the cartridge.

As shown in FIGS. 13 and 14, a winder 44 for new-type negative film is provided at an intermediate portion of the third feed passage 16. This winder 44 has a spool having a rotary shaft synchronously driven by the motor 19M through pulleys and belts 36. Provided around the winder 44 is a film guide 45 driven by a solenoid 46 to guide a film tip being inserted. Film is pressed against the spool by a film presser 47 biased by a spring 47a.

Now description is made of the operation of the negative mask unit 3 of the second embodiment. The negative mask unit 3 shown can process both 135 film or reference film and new-type film. It can carry out the following three processing methods;

1) processing of reference film;
2) processing of new-type film in a cartridge; and
3) processing of new-type film in a strip.

The above processing methods are hereinafter abbreviated to processes 1–3.

In Process 1, a negative mask 20 having a width suitable for 135 film, shown in FIGS. 10 and 12, is used to process 135 film which is a reference film. While not shown, as a scanner unit, the light source 1, mirror tunnel 2, negative mask unit 3 as shown in FIG. 1 are commonly used. It is possible to guide image light to a scanner unit and read image information by rotating or moving the lens unit 4 out of the optical path and inserting a reflecting mirror thereinto.

If such a scanner unit is used, when 135 film F is inserted through the inlet 31 near the first feed passage 14, a film insertion sensor 31s detects the tip of the film, activating the rotation of the feed rollers 32 (by motor 19M) to feed film F forward along the first feed passage 14. The perforation sensor 34 detects the amount of feed. The frame detection sensor 33 detects each frame image area. The DX sensor 35 detects film type and other information.

After detection of various kinds of information, 135 film is stopped temporarily every time each of its frames aligns with a mask opening 21 of the negative mask 20, and the image information is read by the scanner means. When the image information of each frame has been read, film F is fed frame by frame.

When information has been read from all the image frames of the negative film F, the film is fed further and stopped at a position where its tail end is still caught between the feed rollers 32 in the third feed passage 16. When the image information has been analyzed, the negative film F is fed in a reverse direction. During the reverse feed, the amount of film fed is calculated and the film is stopped temporarily at positions where each of its frames aligns with the negative mask 20 for printing/exposure in which the amount of light from the light source 1 is adjusted based on the image information read.

When printing/exposure for all the image frames is finished, the negative film F is further fed in reverse to take it out. Instead of carrying out printing/exposure during reverse feed, the film may be rewound entirely and then fed forward for printing/exposure.

In the above description, it is assumed that the printing/exposure unit is also used as the scanner unit. However, a separate scanner unit comprising a light source 1, a mirror tunnel 2, and a negative mask unit 3 may be provided separately to read image information before printing/exposure.

In this case, since image information has been read beforehand, negative film F has only to be fed forward, and only the position information from the perforation sensor 34 is needed. The frame detection sensor 33 and the DX sensor 35 are not needed. But these sensors are all needed in the separate scanner unit.

Since narrow new-type film is insertable through the inlet 31 for 135 film, new-type film may be inserted through the inlet 31 by mistake. Thus in this arrangement, there are two insertion sensors 31s provided, so that film (135 film) is fed only if the insertion of the film has been detected by both sensors 31s (this means that film is 135 film).

On the other hand, it is also possible to process new-type film without detaching it from a cartridge in Process 2. In this case, the negative mask 20 is replaced with a mask of a size corresponding to the new-type film, the mask-related parts 30 are replaced with ones for new-type film, a cartridge X is inserted into the space 37, and one of the cartridge holders 37a is moved by the solenoid 19s to grip the cartridge X between the cartridge holders 37a. Then, one of the protruding shafts 38b is rotated by the solenoid 38c to open the door of the cartridge X, and one of the shafts 38a is rotated by the motor 19M to unwind the negative film.

The unwound negative film F is fed by the feed rollers 32', its feed amount is detected by the perforation sensor 34', bar-coded information such as the kind of film, which is recorded on one side of the film, is detected by a bar code sensor 35', and various shooting conditions and other information recorded on new-type film are detected by a magnetic head 33X'.

If the printing/exposure unit is used also as the scanner unit, after each image frame is stopped at the position aligned with the negative mask 20, and the image information has been read by the scanner means, the film is fed a little. The film is thus fed past the negative mask 20 until all the frames are wound onto a winder 44 in the third feed passage 16. While the film is being wound, data necessary to determine printing/exposure conditions such as the average image density of all the image frames are calculated.

Next, the negative film F wound onto the winder 44 is unwound to print/expose the image on each frame to a photosensitive material. When all the frames have been printed and exposed, the entire negative film F is wound into the cartridge X. But instead, the entire film may be wound into the cartridge X and then unwound for printing/exposure with its front end first.

When the negative film is unwound from the cartridge X in the above process, its tail end is kept fastened to the cartridge X, and its portion from the tail end to the negative mask 20, i.e. the portion in the second and third feed passages 15, 16 is left as a dead space film. Thus, the film can thus be freely wound and unwound between the cartridge X and the winder 44.

Reference film or 135 film is too wide to be insertable into the inlet 31' for new-type film. Thus in this case, no sensor for detecting erroneous insertion of film is necessary. If necessary, sensors similar to the insertion sensors 31s may be provided.

Processes 1 and 2 are basic operations in which the reference film or new-type film is inserted from the inlets 31, 31' of the mask-related members 30, 30' for printing/exposure. But besides processes 1 and 2, the negative mask unit 3 of this embodiment can also perform process 3.

Figure 16:
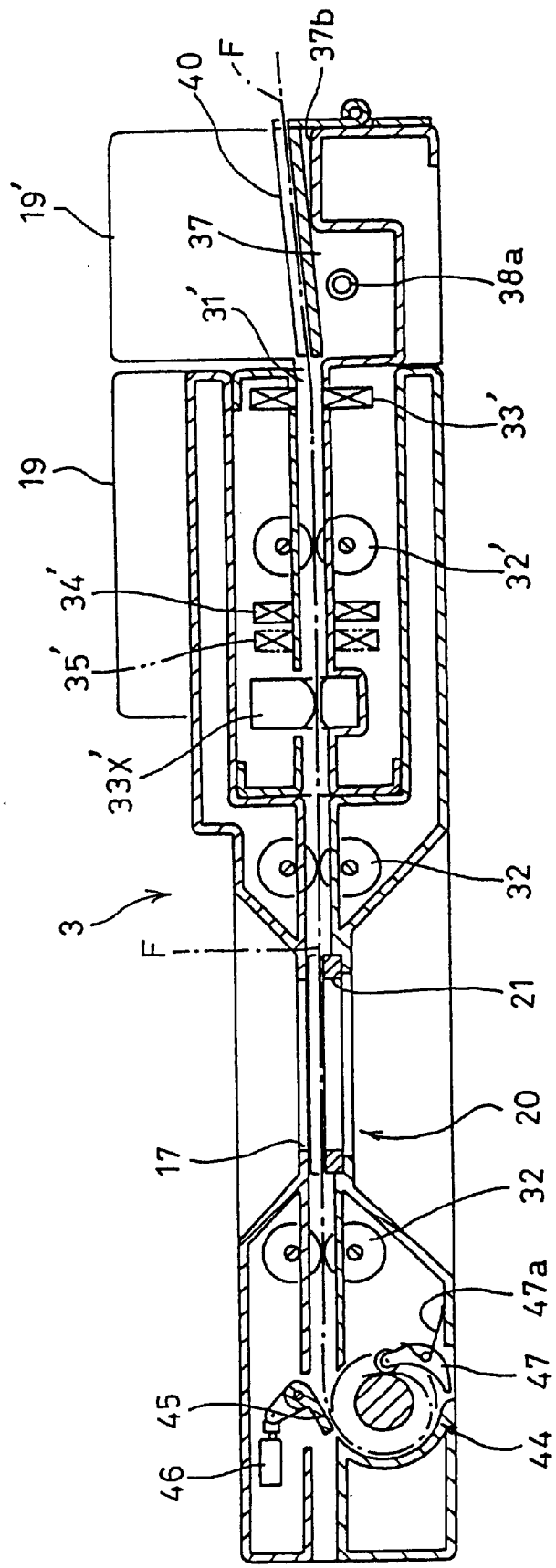
FIG. 16 shows how a strip of new-type film is processed.

In Process 3, as shown in FIG. 16, it is possible to process new-type film that has been entirely taken out of a cartridge X into the form of a strip of film. To process such a strip of new-type film, the film guide 40 is inclined toward the insertion space 37 as shown in FIG. 16, and the film is placed on the guide 40 and manually inserted through the inlet 31'. The steps thereafter are the same as with film attached to a cartridge.

The necessity for the processing of a strip of new-type film is present because one sometimes wishes to print strip film rather than rewinding film into a cartridge after development for the convenience of personnel arrangement.

Figure 17:
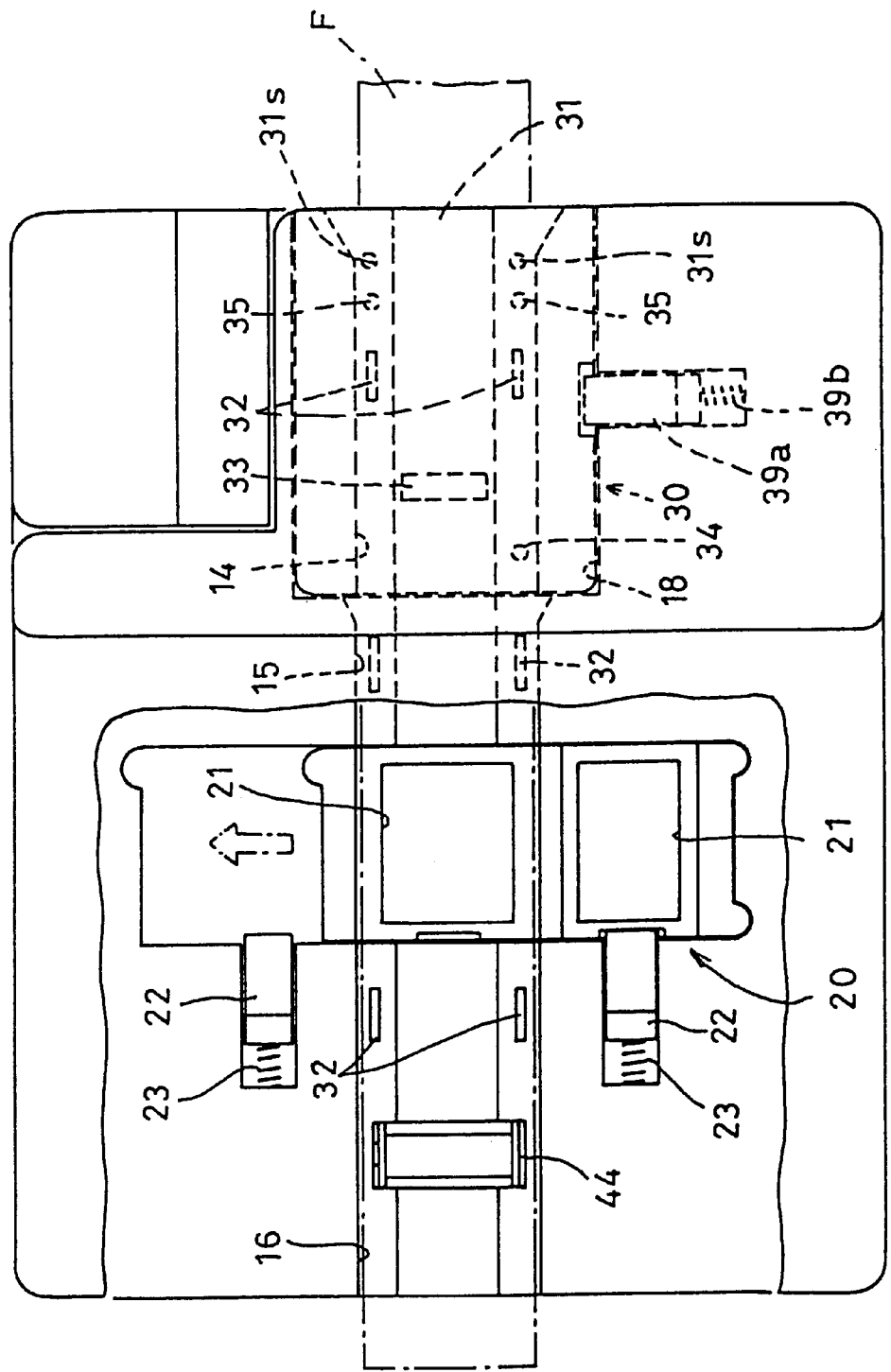
FIG. 17 is a plan view of a slide type negative mask exchange arrangement.

In the above-described embodiment, one the negative masks 20 for reference film and new-type film having openings 21 (exposure windows) of different sizes is exchanged for the other and set. In an alternate embodiment shown in FIG. 17, a negative mask moving passage is provided so as to extend in a direction perpendicular to the film feed passage and an integral negative mask assembly is mounted on the negative mask moving passage so that one the negative masks formed with openings 21 (exposure windows) for reference film and new-type film can be set in position by sliding them.

In this embodiment, the straight portion of the T-shaped mask-related member 30' for new-type film is identical in shape to the mask-related member 30 for reference film, and both can be detachably set in the mounting space 18. But the T-shaped base portion of the mask-related member 30' for new-type film may be fixed to the negative mask body 10 so that the mask-related member 30 for reference film and the straight portion of the mask-related member 30' for new-type film can be exchanged and set in position for respective films.

What is claimed is:

1. A negative mask unit, comprising:

a body having first and second sides opposite each other;

a film feed passage located in said body, said film feed passage comprising:
  a first passage for a first film type,
  a second passage for a second film type, and
  a third passage for the first film type, said third passage being connected to said second passage, and wherein said first, second and third passages are on substantially a same plane;

changeover means being located at a connecting point between said second and third passages, said changeover means operable to guide the first film type;

a discharge passage for the first film type being provided in said body so as to extend in a direction different from a direction in which said second passage extends;

a removeable negative mask having first and second sides being provided in said film feed passage, wherein said first passage is located on said first side of said removeable negative mask and said second and third passages are located on said second side of said removeable negative mask;

a winder provided in said first passage, said winder being operable to wind the second film type;

a film guide provided in said first passage, said film guide being operable to guide the second film type to said winder; and two sets of mask-related members, a first set for the first film type and a second set for the second film type, each set comprising:
a film inlet, and
feed rollers to feed film inserted through said film inlet,
said first set of mask-related members for the first film type being provided on said first side of said body and said second set of mask-related members for the second film type being provided on said second side of said body, whereby according to a type of negative film inserted into the negative mask unit, one of said two sets of mask-related members is selected for exposure processing.

2. A negative mask unit claimed in claim 1, further comprising:
a space for inserting a cartridge for the second film type;
a cartridge drive device to unwind film from the cartridge; and
a strip film insertion guide for a strip of the second film type, wherein said space, said cartridge drive device and said strip film insertion guide are all located at said film inlet of said second set of mask-related members, and wherein either the second film type in a cartridge or a strip of the second film type can be inserted through said film inlet of said second set of mask-related members.

3. A negative mask unit claimed in claim 1, wherein said first set for the first film type further comprises:
a frame detection sensor,
a perforation sensor, and
and a DX sensor; and
wherein said second set for the second film type further comprises:
a perforation sensor,
a bar code sensor, and
a magnetic sensor.

4. A negative mask unit claimed in claim 2, wherein said first set for the first film type further comprises:
a frame detection sensor,
a perforation sensor, and
and a DX sensor; and
wherein said second set for the second film type further comprises:
a perforation sensor,
a bar code sensor, and
a magnetic sensor.

5. A negative mask unit claimed in claim 1, further comprising an inclined surface being provided at the connecting point between said second and third passages, said inclined surface being operable to guide the first film type into said discharge passage.

6. A negative mask unit claimed in claim 1, wherein the first film type comprises 135 type negative film or 110 type negative film and the second film type comprises advanced photo system (APS) film.

7. A negative mask unit, comprising:
a body;
a film feed passage located in said body;
a removeable negative mask provided in said film feed passage; and
a mounting space provided on one side of said removeable negative mask for mounting one of a plurality of mask-related members, wherein each of said plurality of mask-related members comprises:
a film inlet, and
feed rollers to feed film inserted through said film inlet,
wherein one of said plurality of mask-related members for a first film type or a second film type is selected and detachably set in said mounting space, and wherein negative film corresponding to the selected mask-related member can be inserted for exposure processing.

8. A negative mask unit claimed in claim 7, wherein said mask-related members for the first film type and said mask-related members for the second film type to be mounted in said mounting space have portions that are substantially identically shaped and said potions are detachably mounted in said mounting space.

9. A negative mask unit claimed in claim 7, further comprising:
a negative mask moving passage is located in said body, so as to extend in a direction perpendicular to said film feed passage; and
an integral negative mask assembly having exposure windows adjacent to each other for both the first film type and new type film is moveable mounted in said negative mask moving passage.

10. A negative mask unit claimed in claim 8, further comprising:
a negative mask moving passage is located in said body, so as to extend in a direction perpendicular to said film feed passage; and
an integral negative mask assembly having exposure windows adjacent to each other for both the first film type and new type film is moveable mounted in said negative mask moving passage.

11. A negative mask unit claimed in claim 7, further comprising:
a common driving unit; and
a plurality of fixed film feed rollers provided in said film feed passage, wherein said plurality of fixed film feed rollers and said feed rollers to feed film inserted through said film inlet, when said mask-related members for the first film type or said mask-related members for the second film type are mounted in said mounting space, are driven synchronously by said common driving unit.

12. A negative mask unit claimed in claim 8, further comprising:
a common driving unit; and
a plurality of fixed film feed rollers provided in said film feed passage, wherein said plurality of fixed film feed rollers and said feed rollers to feed film inserted through said film inlet, when said mask-related members for the first film type or said mask-related members for the second film type are mounted in said mounting space, are driven synchronously by said common driving unit.

13. A negative mask unit claimed in claim 7, wherein the first film type comprises 135 type negative film or 110 type negative film and the second film type comprises advanced photo system (APS) film.

14. A negative mask unit claimed in claim 7, wherein each of said plurality of mask-related members further comprises sensors for the film inserted through said film inlet.

* * * * *